Oct. 7, 1930.  E. REICH  1,777,733
ELECTRICAL MEASURING INSTRUMENT

Filed March 31, 1928

INVENTOR :
Ernest Reich,
By Attorneys,
Abraham Engel.

Patented Oct. 7, 1930

1,777,733

UNITED STATES PATENT OFFICE

ERNEST REICH, OF BUDAPEST, HUNGARY

ELECTRICAL MEASURING INSTRUMENT

Application filed March 31, 1928. Serial No. 266,184.

My present invention relates to electrical measuring instruments and more particularly to ammeters, and aims to provide certain improvements therein.

An object of my invention is to provide a device of the character described, equally well adapted for use with both direct and alternating current, by means of which the current flowing in a conductor can be measured without causing a break in the conductor or necessitating the physical attachment of the ends of the conductor to the instrument.

The foregoing and other objects of my invention, which will be apparent from the description that follows, I accomplish by providing a device comprising magnetic permeable means having a gap therein across which magnetic flux may pass when a conductor through which a current is flowing is brought into proximity to said means, and an element of high magnetic permeability mounted within said gap. Preferably, the device comprises one or more cores of iron or other magnetic permeable material in which the magnetism induced by the magnetic lines of force which surround a conductor through which a current is flowing are colletced and causing said induced magnetism to exercise its tractive force or turning moment upon a rotatable soft iron segment disposed in the magnetic field of the core or cores, to rotate said segment proportionally to the current flowing in the conductor.

Certain preferred embodiments of my invention are illustrated in the accompanying drawings, wherein.

Figure 1:
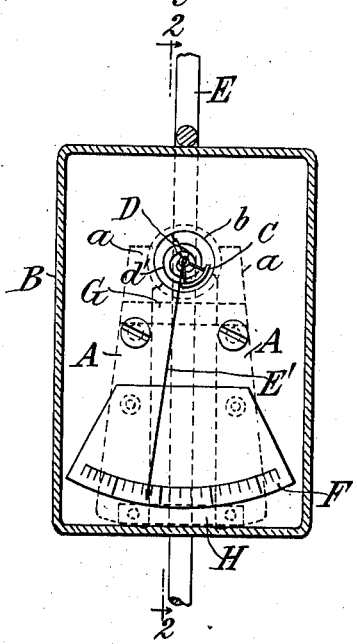
Figure 1 is a section taken substantially along the plane of the line 1—1 of Figure 2.
Figure 2:
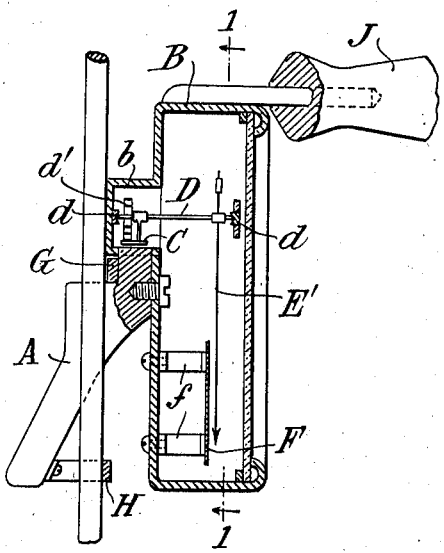
Fig. 2 is a longitudinal section substantially along the plane of the line 2—2 of Fig. 1.

Referring first to Figs. 1 and 2 of the drawings, let A, A indicate two iron cores arranged substantially parallel to each other and being formed at their upper ends with pole pieces $a, a$ which support a cylindrical portion $b$ of a housing B. Within said cylindrical portion $b$ between the pole pieces $a, a$ is a soft iron segment C which is fixedly mounted upon a rotatable shaft D, said shaft being supported in suitable bearings $d, d$ carried by the housing B. The specific shape of the cores A, A may be straight, angular, etc., but it is preferable that they be spaced apart in order that a conductor such as E carrying a current may be placed therebetween so that the magnetic field surrounding said conductor will exercise its influence upon the cores to induce magnetism therein. The magnetism so induced in the cores collects at the pole pieces $a, a$ and is disseminated through the space between said pole pieces within the housing portion $b$.

The lines of force in passing from one pole piece to the other are intercepted by the segment C, which being of soft iron and high magnetic permeability has the property of deflecting said lines of force in a manner to cause them to pass therethrough, which deflection exercises a tractive force or turning moment upon said segment against the action of a spiral spring $d'$ sufficient to cause the segment to turn through an arc. The angular displacement of the segment it will be apparent will be proportional to the induced magnetism.

To measure the strength of the turning moment acting upon the segment C the shaft D is provided with a pointer E' which is movable over a calibrated scale F, the pointer and scale being enclosed within the housing B. As herein shown, the scale F is supported upon suitable brackets $f$ attached to the housing B. As is customary the movement of the pointer may be controlled by any conventional damping means (not shown).

For the measurement of currents up to fifty amperes it is advantageous to have the iron cores extending substantially parallel to each other so that a long part of the conductor may be positioned between said cores in order that a large number of collected lines of force shall be active at the pole pieces. The embodiments of the invention shown in Figs. 1, 2 and 3 are particularly adaptable for measuring currents within this range.

If desired, the effective measuring range of the instrument can be varied, for example, by placing a flux shunt G across the pole pieces in proximity to the cores, or by increasing or decreasing the distance of the iron cores from the conductor by the employment of a spacing element such as a hoop H, which together with the rear wall of the housing B form suitable spacing means for the conductor. Occasionally it is advantageous to provide the instrument with a handle so that it may be more easily manipulated, and in Fig. 2 I have accordingly shown the housing B as provided with a handle J. In order that the instrument may be handled with less caution and freedom from shock to the operator, I preferably form the housing B thereof of insulating material. It will be understood, however, that the housing may also be formed of any magnetic impermeable material.

Figure 3:
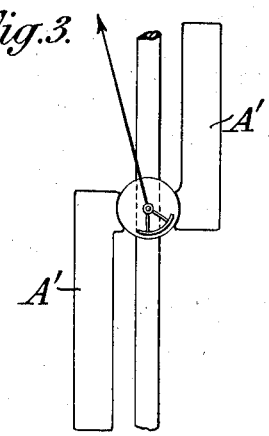
Fig. 3 is a diagrammatic section corresponding to Fig. 1, of a modification.
Figure 4:
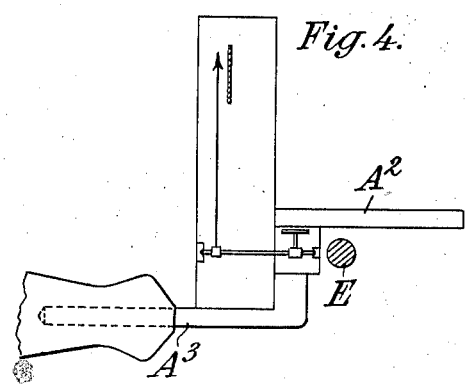
Fig. 4 is a diagrammatic section of still another modification.

In Fig. 3 I have shown an arrangement of the iron cores A', A' with their pole pieces facing each other and their body portions extending in opposite directions.

Where conditions are such that it is impracticable to have the conductor extend parallel to the iron cores, for example in a cable box where there is but little room, the arrangement of the cores may be modified. One such arrangement is shown in Fig. 4 wherein the iron cores $A^2$, $A^3$ extend perpendicularly to the axis of the conductor E, with the arm $A^3$ not under the direct influence of the magnetic field of the conductor but in a position such as to increase the effect of said magnetic field upon the core $A^2$. According to this arrangement I have found by experimentation that from one to five times greater turning moment is obtained for a given current strength. Because of this fact, it is apparent that the arm $A^2$ can be made shorter and the arm $A^3$ made to serve as a handle for the instrument.

In use, the segment C of the instrument will normally assume a position which will set the pointer E' at zero. To measure the current passing through the conductor E, said conductor is placed between the iron cores A, A, A', A' or $A^2$, $A^3$ as shown in the various figures. The magnetic field surrounding the conductor E induces magnetism into the iron cores which lines of force are collected in the pole pieces and in passing from one pole piece to the other are deflected by the iron segment C and exercise thereon the turning moment which will move said segment through an arc proportional to the current flowing in the conductor. It will thus be seen that the current flowing through a circuit can be quickly measured without resorting to severing the conductor or physically touching the ends thereof to the instrument.

While I have shown and described certain preferred embodiments of my invention I do not wish to be limited to the precise constructions disclosed since modifications in the structure and arrangement of parts may be resorted to without departing from the spirit of the invention.

What I claim is:

1. A device of the character described for measuring current flowing through a conductor without interrupting the current or physically connecting the conductor to the device, comprising magnetic permeable means having a gap therein for receiving a conductor through which a current is flowing, a pair of pole pieces on said magnetic permeable means, and a non-polarized element of high magnetic permeability rotatably mounted within said pole pieces.

2. A device of the character described for measuring current flowing through a conductor without interrupting the current or physically connecting the conductor to the device, comprising magnetic permeable means having a gap therein for receiving a conductor through which a current is flowing, a pair of pole pieces on said magnetic permeable means, a non-polarized element of high magnetic permanently rotatably mounted within said pole pieces, means for indicating the arc through which the rotatable element is moved, and mechanical means for resisting the rotation of the rotatable element in one direction and for restoring it to its normal position.

3. A device of the character described, comprising a pair of iron cores disposed to permit a conductor through which a current is flowing to be positioned therebetween to extend parallel thereto without interrupting said current flow, and a non-polarized rotatable iron segment mounted between the ends of said cores.

4. A device of the character described according to claim 2, characterized in that the indicating means are mounted within an enclosed housing, and a handle on said device for presenting the instrument into measuring relation with a conductor.

In witness whereof, I have hereunto signed my name.

ERNEST REICH.